J. Collins.
Wheel Cultivator.
N° 34,406. Patented Feb. 18, 1862.
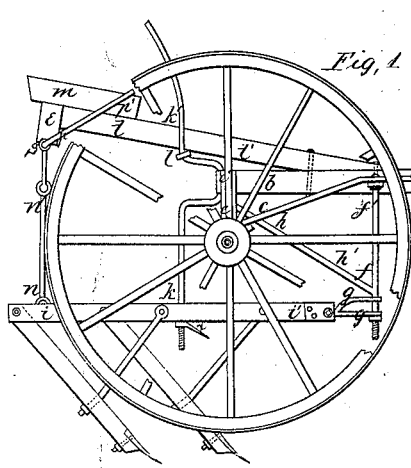
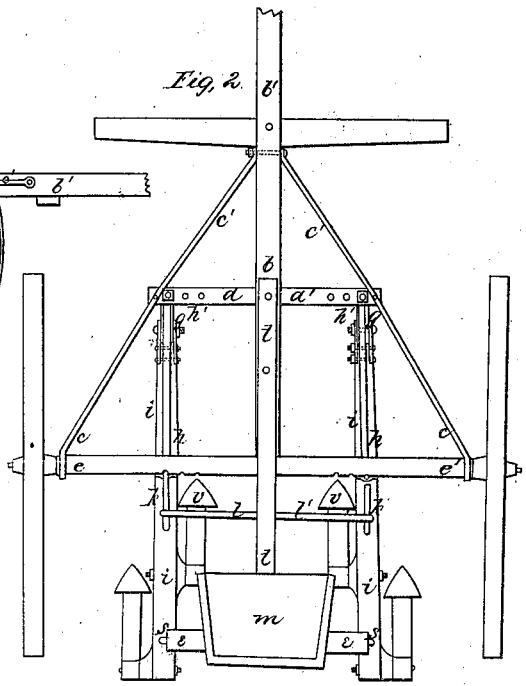
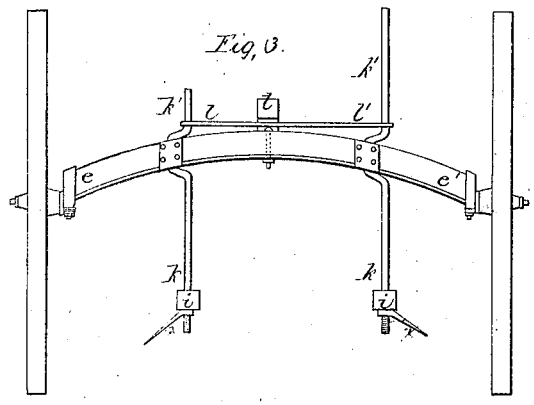
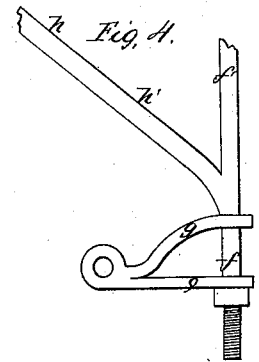
Witnesses,
H. J. Vaughan
Wm. Caldwell
Inventor,
James Collins

UNITED STATES PATENT OFFICE.

JAMES COLLINS, OF FARMINGTON, ILLINOIS.

IMPROVEMENT IN CULTIVATORS.

Specification forming part of Letters Patent No. 34,406, dated February 18, 1862.

*To all whom it may concern:*

Be it known that I, JAMES COLLINS, of Farmington, in the county of Fulton and State of Illinois, have invented certain new and useful Improvements in Cultivators; and I do hereby declare that the following is a full, clear, and exact description of the same, reference being had to the accompanying drawings, making part of this specification, in which—

Figure 1 is a side elevation of the implement. Fig. 2 is a top view of the same. Fig. 3 is a rear view of the wheels, axle, plow-beams, and guide-rods, hereinafter described. Fig. 4 is a detached view, on a larger scale, of the clevis, with a portion of the draft-rod and brace by which each plow-beam is attached to the tongue.

Similar letters of reference indicate corresponding parts in the several figures.

My invention consists, first, in a combination of pendent rods and braces for attaching the plow-beams to the upper or main frame; second, in a device for permitting a free vertical and lateral motion of the plows, and at the same time securing them from rocking or departing from a correct vertical position; third, in an improved device for moving the plows laterally as required; fourth, in a general combination of devices adapted to increase the efficiency of the implement and its ease of operation in cultivating growing crops.

To enable others skilled in the art to make and use my invention, I will proceed to describe its construction and operation.

$a$ $a'$ represent a horizontal iron bar, passing transversely through a mortise on the tongue $b$ $b'$, and secured at its ends to brace-rods $c$ $c'$, which extend from the under side of the axle-tree $e$ $e'$ forward to the tongue $b$ $b'$. Near the outer ends of the cross-bar $a$ $a'$ two pendent vertical draft-rods, $f f'$, are attached, as shown in Fig. 1, and to the said rods $f f'$, near their lower ends, iron braces $h$ $h$ are welded. The said braces extend from the draft-rods backward to the under side of the axle-tree in a line with the plow-beams $i$ $i'$, and are sufficiently strong to sustain the draft of the plows. By this means the pendent rods $f f$ may project down from the upper frame a sufficient distance to permit the plow-beams to work in a horizontal position, and still dispense with the necessity for oblique draft rods or chains extending in front of the wheels and beneath the tongue. The efficient and easy operation of the machine is thus greatly promoted.

$g$ represents a hinged clevis, attached to the front end of each of the plow-beams $i$ $i'$ in the following manner: An iron plate of sufficient length is securely bolted on each side of the beams, projecting in front thereof sufficiently far to receive the end of the clevis, which is inserted between them and secured by a nicely-fitting bolt, forming a hinge-joint, which permits the free vertical motion of the rear end of the beams. The forward end of the clevis $g$ is branched vertically, as clearly shown in Fig. 1, and formed with eyes, which fit upon the lower ends of the rods $f f'$ below the braces $h$ $h$, the said lower ends of the rods being made round for this purpose. By this mode of attachment free vertical and lateral motion is afforded to the plows, while they are at the same time effectually secured against rocking or any deviation from a correct vertical position.

$k$ $k'$ are vertical crank-levers, which may be attached either to the front or back of the axls $e$ $e'$. The wrists of the said levers may be journaled to the axle in any suitable manner, and the lower ends are received and work loosely in mortises in the beams, the said mortises being about three inches long and sufficiently wide to allow the beams to work freely up and down. The arms of the cranks may be about six inches in length, and one of the rods extends backward, as shown in Fig. 1, a sufficient distance to enable the operator by applying a hand thereto to move the plows laterally in either direction while at work.

$l$ $l'$ is a tie-rod connecting the crank-levers together, so that a simultaneous movement may be imparted to both plow-beams. The crank-levers above described are threaded for a short distance at their lower ends, and a nut, $x$, is applied thereto for the purpose of adjusting the height of the beams and thereby the depth at which the plows will work. Similar threads and nuts upon the rods $f f'$ permit the adjustment of the forward ends of the beams, so that while set at any height desired the beams may be retained in a horizontal position.

$p$ $p'$ is a hand lever, employed to raise the plows out of the ground by means of a transverse rod, $s$, to which the said lever is rigidly secured. The rod $s$ is supported by a beam, $r$ $r'$, on which the seat $m$ is mounted.

$n\ n'$ represent rods or straps, which may be of iron, leather, or other material, and are attached at their lower ends to the beams $i\ i'$ and at their upper ends to arms projecting rigidly from the rod $s$. By a downward or forward motion of the lever $p$ the arms are thrown up, and the plows thereby elevated to any extent required.

The axle-tree is curved upward, as shown in Fig. 3, to adapt it to pass more readily over standing corn, and is furnished with a bar of iron, extending beneath it from end to end. Upon the ends of this bar the journals or arms upon which the wheels run are formed.

The axle may, if preferred, be furnished with a number of boxes to receive the crank-levers $k\ k'$, in order to set the said levers at any distance asunder, and thus regulate the distance of the plows to suit the size of the plants and the condition of the ground.

By setting the clevis $g$ upside down the height of the beam may be varied, and a like effect may be produced by the use of washers interposed between the clevis and the nut which supports it upon the rod $f f'$.

Having thus described my invention, what I claim therein as new, and desire to secure by Letters Patent, is—

1. The combination of the perpendicular draft-rods $f f'$, depending from the transverse bar $a\ a'$, and braces $h\ h$, extending back from the lower part of the said draft-rods to the axle-tree, all constructed and arranged as described, and for the purposes stated.

2. The combination of the clevis $g$ and draft-rods $f\ f$, when constructed and operating as and for the purposes set forth.

3. The crank-levers $k\ k'$ and adjusting-nuts $x$, constructed and arranged in connection with a corn-plow on wheels in the manner and for the purposes set forth.

4. The combination of the cross-bar $a\ a'$, draft-rods $f f'$, braces $h\ h'$, clevis $g$, adjusting-levers $k\ k'$ and $p\ p'$, curved axle-tree $e\ e'$, and seat $m$, all substantially as and for the purposes set forth.

JAMES COLLINS.

Witnesses:
  WM. CALWELL,
  H. J. VAUGHAN.